United States Patent [19]

Adler et al.

[11] 3,864,432

[45] Feb. 4, 1975

[54] PROCESS FOR THE PRODUCTION OF AN ELASTICIZED THERMOPLASTIC POLYMER MIXTURE IN A POURABLE POWDER FORM

[75] Inventors: Klaus Adler; Johann Bauer; Rupert Englbrecht; Werner Turba; Englbert Pichler; Adolf Maluschka, all of Burghausen, Germany

[73] Assignee: Wacker-Chemie GmbH, Munich, Germany

[22] Filed: Nov. 22, 1972

[21] Appl. No.: 308,738

[30] Foreign Application Priority Data
Dec. 7, 1971    Germany............................ 2160743

[52] U.S. Cl................ 260/897 B, 260/42, 260/873, 260/887, 260/889, 260/890, 260/891, 260/897 C
[51] Int. Cl. ............................................ C08f 37/18
[58] Field of Search............................ 260/897, 873

[56] References Cited
UNITED STATES PATENTS

| | | | |
|---|---|---|---|
| 3,125,545 | 3/1964 | Van Cleve et al.................. | 260/45.5 |
| 3,463,751 | 8/1969 | Hasegawa et al...................... | 260/23 |
| 3,682,857 | 8/1972 | Harris et al......................... | 260/33.8 |

*Primary Examiner*—Murray Tillman
*Assistant Examiner*—C. J. Seccuro
*Attorney, Agent, or Firm*—Hammond & Littell

[57] ABSTRACT

A process for the production of an elastomer treated thermoplastic polymer in a pourable powder form consisting essentially of adding an aqueous elastomeric resin dispersion to a thermoplastic polymer powder, mixing the two components under high sheer agitation at below the gelling temperature of said thermoplastic powder for a time sufficient to obtain a homogeneous distribution of the elastomeric resin on said thermoplastic powder and recovering said elastomer treated thermoplastic polymer in a pourable powder form.

4 Claims, No Drawings

PROCESS FOR THE PRODUCTION OF AN ELASTICIZED THERMOPLASTIC POLYMER MIXTURE IN A POURABLE POWDER FORM

THE PRIOR ART

The incorporation of elastomeric components in thermoplastics to improve mechanical properties, such as notch impact resistance or stress corrosion cracking, is known. As the elastomers to be incorporated are not present as a pourable powder, it is necessary, for their homogeneous distribution, to effect incorporation under plasticizing heating of the thermoplasts. To be suitable for processing, the resulting composition must be transformed into a pourable product. This is usually done by granulation of the mixture. This process inevitably involves thermal stress of the thermoplastic polymer.

OBJECTS OF THE INVENTION

An object of the present invention is the development of a process for the production of an elastomer treated thermoplastic polymer in a pourable powder form consisting essentially of adding an aqueous elastomeric resin dispersion to a thermoplastic polymer powder, mixing the two components under high sheer agitation at below the gelling temperature of said thermoplastic powder for a time sufficient to obtain a homogeneous distribution of the elastomeric resin on said thermoplastic powder and recovering said elastomer treated thermoplastic polymer in a pourable powder form.

Another object of the invention is the obtaining of an elastomer treated thermoplastic polymer in a pourable powder form produced by the above process.

These and other objects of the invention will become more apparent as the description thereof proceeds.

DESCRIPTION OF THE INVENTION

A process has now been discovered for the production of an elastomer treated thermoplastic polymer in a pourable powder form from a thermoplastic resin granule and an elastomer dispersion, preferably an elastomer latex, which is characterized in that an aqueous elastomer resin dispersion is added to a thermoplast in powder form and the two components are mixed in a mixer with rapidly rotating agitators below the gelling temperature of the thermoplast to homogeneous distribution of the elasticizing resin on thermoplasts.

It is, surprisingly, that despite the addition of the elastomer resin in the form of an aqueous dispersion, no gluing of the thermoplast in powder form occurs, but that after short mixing times homogeneous mixtures result, which moreover no longer contain any water.

More particularly the invention involves a process for the production of an elastomer treated thermoplastic polymer in a pourable powder form consisting essentially of adding an aqueous elastomeric resin dispersion to a thermoplastic polymer powder, mixing the two components under high sheer agitation at below the gelling temperature of said thermoplastic powder for a time sufficient to obtain a homogeneous distribution of the elastomeric resin on said thermoplastic powder and recovering said elastomer treated thermoplastic polymer in a pourable powder form, as well as the elastomer treated thermoplastic polymer in a pourable powder form produced by the process.

The thermoplasts in powder form used in the process are conventional thermoplastic polymer granules in powder form having average particle sizes of from 20 to 500 microns such as polyvinyl chlorides, polyvinyl chloride copolymers, polyethylene, polyethylene copolymers, polypropylene, polyamides and polyesters.

The aqueous elastomer resin dispersions employed also include aqueous elastomer latexes which are preferred. Examples of elastomers in aqueous dispersions are natural rubber latexes and synthetic rubber latexes such as, for example, those latexes prepared from acrylonitrile/butadiene/styrene, alkyl methacrylates, butadiene/styrene, butadiene, butadiene/alkyl acrylates; as well as polyvinyl acetate dispersions and, preferably, ethylene/vinyl acetate copolymer dispersions especially those having from 40 to 85 percent content of vinyl acetate.

For 100 parts of the thermoplasts in powder form, a maximum of 50 parts of a 50 percent aqueous elastomeric resin dispersion is employed. If these dispersions contain less than 50 percent by weight of solids, only so much dispersion is added so that not more than 25 parts by weight of water per 100 parts of thermoplast are present in the mixer.

The mixing of the ingredients under high sheer agitation is conducted in mixers with rapidly rotating agitators such as, for example, fluid, intensive and rapid mixers which may be also vacuum mixers. According to the invention, high sheer agitation or rapidly rotating agitators are those which rotate at 1,000 to 3,000 revolutions per minute. The circumferential velocity at the tip of the mixing blade is usually between 10 and 40 m per second.

The process is carried out in a simple manner by charging the components to be mixed in an adequate mixer. The dispersions can be charged all at once or in batches. The temperature of the mixture is always maintained below the gelling point of the thermoplast. This can be done by regulating the speed of revolution of the mixing agitators or possibly by heating or cooling. Usually the mixing temperatures are maintained between 70° and 100°C. The mixing times are generally between 10 minutes and one hour and until the mixture is substantially anhydrous.

Toward the end of the mixing operation, it is advantageous in some cases to add to the mixing stock from 0.05 to 10 percent by weight, preferably 0.5 to 1.5 percent by weight based on the total mixer charge, of finely divided substances as, for example, highly dispersed silicic acid, talc, aluminum oxide, titanium oxide, chalk, and asbestos flour. This measure increases in some cases the pourability of the polymer mixture obtained.

The process of the invention makes it possible in one operation to incorporate an aqueous elastomeric resin dispersion in a thermoplast, without any strong thermal stresses occuring on the polymers. Pourable, anhydrous products are obtained which are very suitable for processing on extruders or injection molding machines.

The granulation required according to prior art is thus avoided.

The following examples are illustrative of the invention without being limitative.

EXAMPLE 1

90 Parts of a suspension polymerized polyvinyl chloride powder having a K value of 70 were mixed with 25 parts of a 40 percent ethylene/vinyl acetate copolymer dispersion (vinyl acetate content 60 percent by weight) in a Papenmeier internal mixer type TLHK 8 at 2840 rpm. The temperature rose to 95°C. After 40 minutes the mixing operation was stopped. Shortly before that, 0.5 parts of highly dispersed silicic acid were added thereto.

The residual moisture of the powder obtained was 0.043 percent by weight. The product poured through a funnel whose diameter was 60 mm at the top, the outlet opening had a diameter of 6 mm, and the side angle was 60°.

EXAMPLE 2

90 Parts of a vinyl chloride/vinyl acetate copolymer containing 10 percent vinyl acetate and having a K value of 65 were mixed with 25 parts of an aqueous 50 percent ethylene/vinyl acetate dispersion (vinyl acetate content 60 percent by weight) in a Papenmeier internal mixer Type TLHK 8 at 2840 rpm for 35 minutes. The temperature of the mass rose to 95°C.

After the end of the mixing operation the material had a residual moisture of 0.06 percent by weight and poured through a funnel whose outlet opening had a diameter of 6 mm, the upper diameter being 60 mm and the side angle 60°.

EXAMPLE 3

95 Parts of a polyethylene powder having a density of 0.947 were mixed with 12.5 parts of a 40 percent ethylene/vinyl acetate dispersion (vinyl acetate content 60 percent by weight) in a Papenmeier mixer, type TLHK 8, at 2840 rpm for 45 minutes. The temperature rose to 95°C. Just before termination of the mixing operation, 0.3 parts of highly dispersed silicic acid was added thereto.

The residual moisture of the powder obtained was 0.036 percent by weight. The powder poured through a funnel whose outlet opening had a diameter of 5 mm, the upper diameter being 60 mm, and the side angle 60°.

EXAMPLE 4

100 Parts of an emulsion polymerized polyvinyl chloride in powder form of a K value 70 were mixed with 25 parts of a 40 percent ethylene/vinyl acetate dispersion (vinyl acetate content 50 percent by weight) in a Henschel mixer, type FM 10, at 2,600 rpm for 30 minutes. The temperature was 90°C. After termination of the mixing operation, the product poured through a funnel whose diameter was 60 mm at the top, the outlet opening 6 mm, and the side angle 60°.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of an elastomer treated thermoplastic polymer in a pourable powder form consisting essentially of adding a maximum of 50 parts of an aqueous elastomeric ethylene/vinyl acetate copolymer dispersion to 100 parts of a thermoplastic polymer powder in such an amount that not more than 25 parts by weight of water in said aqueous dispersion are present per 100 parts by weight of said thermoplastic polymer powder, mixing the two components under high sheer agitation at agitation speeds of from 1,000 to 3,000 RPM, at below the gelling temperature of said thermoplastic powder for a time sufficient to obtain a homogeneous distribution of the elastomeric resin on said thermoplastic powder and to obtain a substantially anhydrous powder, and recovering said elastomer treated thermoplastic polymer in a pourable powder form.

2. The process of claim 1 wherein said thermoplastic polymer powder is a powder of a thermoplastic polymer selected from the group consisting of polyvinyl chloride, polyvinyl chloride copolymers, polyethylene, polyethylene copolymers, polypropylene, polyamides and polyesters.

3. The process of claim 1 wherein said ethylene/vinyl acetate copolymer has a vinyl acetate content of from 40 to 75 percent.

4. The process of claim 1 wherein said high speed agitation is conducted with mixing blades having a circumferential velocity at the tip of said mixing blade of from 10 m to 40 m per second.

* * * * *